United States Patent [19]

Blizzard et al.

[11] Patent Number: 5,840,428
[45] Date of Patent: Nov. 24, 1998

[54] ORGANICALLY-MODIFIED, RADIATION-CURABLE SILOXANE RESIN AND METHOD OF MAKING THE SAME

[75] Inventors: John Donald Blizzard, Bay City; James Steven Tonge, Sanford, both of Mich.

[73] Assignee: Dow Corning Corporation, Midland, Mich.

[21] Appl. No.: 699,257

[22] Filed: Aug. 19, 1996

Related U.S. Application Data

[63] Continuation-in-part of Ser. No. 395,250, Feb. 28, 1995, abandoned.

[51] Int. Cl.$^6$ .............................. C08F 2/50; C08F 283/12; C08L 83/06; C08L 83/07
[52] U.S. Cl. .................. 428/412; 428/447; 428/480; 428/35.7; 522/84; 522/85; 522/172; 528/26; 528/32; 528/38; 524/806
[58] Field of Search ................................. 522/84, 42, 99, 522/172, 85; 528/26, 32, 38; 524/806, 837, 838; 428/412, 447, 480, 35.7

[56] References Cited

U.S. PATENT DOCUMENTS

| | | | |
|---|---|---|---|
| 4,455,205 | 6/1984 | Olson et al. | 204/159.13 |
| 4,486,504 | 12/1984 | Chung | 428/412 |
| 4,814,017 | 3/1989 | Yoldas et al. | 106/287.12 |
| 5,260,350 | 11/1993 | Wright | 522/42 |
| 5,470,616 | 11/1995 | Uenishi et al. | 427/515 |

FOREIGN PATENT DOCUMENTS

| | | | |
|---|---|---|---|
| 486469 | 9/1987 | European Pat. Off. | C08F 230/08 |
| 0544465 | 11/1992 | European Pat. Off. | C09D 4/00 |

OTHER PUBLICATIONS

"Chemistry and TEchnology of Silicones", Walter Noll, Academic Press, pp. 395–397, 1968.

"Silicon–Based Polymer Science A Comprehensive Resource" by Ziegler and Fearon, American Chemical Society, pp. 224–239. 1990.

"Hawley's Condensed Chemical Dictionary" Sax and Lewis, Van Nostrand NY p. 220, 11th Edition, 1987.

*Primary Examiner*—Susan W. Berman
*Attorney, Agent, or Firm*—Arne R. Jarnholm

[57] ABSTRACT

Novel radiation-curable, organically-modified siloxane resin compositions are prepared from (A) at least one multifunctional acrylate and (B) the reaction product formed from (a) an alkoxy-functional organometallic compound, (b) an alkoxy silane and (c) water. The alkoxy silane (b) includes at least one functional group that renders the alkoxy silane copolymerizable with the multifunctional acrylate (A). The alkoxy-functional organometallic compound (a) and the alkoxy silane (b) undergo co-hydrolysis and co-condensation, which is optionally carried out in the presence of a siloxane polymerization catalyst (d).

22 Claims, No Drawings

ORGANICALLY-MODIFIED, RADIATION-CURABLE SILOXANE RESIN AND METHOD OF MAKING THE SAME

CROSS-REFERENCE TO RELATED APPLICATION

This application for patent is a continuation-in-part of U.S. patent application Ser. No. 08/395,250 filed on Feb. 28, 1995, now abandoned.

BACKGROUND OF THE INVENTION

1. Field of the Invention

The present invention relates generally to the field of organically-modified, radiation-curable siloxane resins, and more particularly to such a resin that includes a multifunctional acrylate and the reaction product of a tetraalkoxy organometallic compound and an alkoxy silane. The alkoxy silane has at least one additional functional group which renders the alkoxy silane copolymerizable with the acrylate.

2. Description of the Prior Art

A number of organically-modified, radiation-curable silicone resins are known in the prior art. Such resins are frequently used to provide abrasion-resistant coatings over easily-scratched substrates, such as polycarbonate or polyethylene terephthalate ("PET.") The coated substrates are often used as a substitute for glass, as in the case of lenses for automobile head lamps.

Other uses may include application over plastic containers that are adapted for receiving beverages. In the case of non-refillable containers, the utility of the coating may be directed solely at providing a barrier film that decreases the gas permeability of the container. In the case of refillable containers, the utility of the coating may be directed at providing a barrier film that exhibits abrasion-resistant properties, either alone or in combination with barrier properties.

Other applications for organically-modified, radiation-curable siloxane resins include casting articles of manufacture and use as bonding agents. Many silicone resins of this type can be impregnated with known slip aids to increase the lubricity of their cured surface.

The siloxane resin compositions of the prior art are generally formulated in a polar solvent, such as isopropyl alcohol, and utilize colloidal silica to impart abrasion resistance. The colloidal silica is usually added in the form of an aqueous dispersion.

Silicone resin compositions of the above type are disclosed in U.S. Pat. No. 4,455,205 to Olson et al. (issued Jun. 19, 1984 and assigned to General Electric Company, Schenectady, N.Y.) The coatings comprise an ultraviolet (UV) light-curable composition prepared from a multifunctional acrylate monomer, an acryloxy-functional silane and aqueous colloidal silica in a polar solvent. After mixing the components, the solvent and remaining water is removed in vacuo, with gentle heating, a step which is termed "stripping." A photoinitiator is then added so that the composition may be UV-cured.

Similarly, U.S. Pat. No. 4,486,504 to Chung, (issued Dec. 4, 1984 and also assigned to General Electric Company) discloses a UV-curable composition prepared from the addition of a multifunctional acrylate monomer to a mixture of acryloxy-functional silanes, and/or glycidoxy-functional silanes and aqueous colloidal silica. After stripping, a photoinitiator is added so that the composition may be UV-cured.

European Patent Application Publication No. 0 544 465 A1, assigned to General Electric Company, discloses a radiation-curable composition formed from: the hydrolysis product of an alkoxysilyl acrylate; aqueous colloidal silica; acrylate monomers; and a photoinitiator. Again, the example compositions are disclosed to be formulated in an alcohol solution.

U.S. Pat. No. 5,260,350 to Wright, discloses a radiation-curable composition which includes an aminoalkoxy silane and a multifunctional acrylate monomer (which form a Michael adduct) and colloidal silica in an aqueous dispersion. The composition is formulated in a polar solvent, such as isopropyl alcohol.

In the above prior art compositions, the water from the aqueous dispersion of colloidal silica causes the alkoxy groups on the silanes (and/or silyl acrylates) to hydrolyze.

The term "hydrolysis," in its strictest sense and as applied to alkoxy silanes, describes the reaction of the silanes, at the alkoxy sites, with water, thus forming silanols and alcohol. The silanols, however, are capable of undergoing a condensation reaction, to form Si-O-Si bonds and water. Accordingly, the term "hydrolysis," and its various other forms, as used herein, is not meant to include the subsequent condensation reaction. Hydrolysis, followed by condensation, will be so-described.

In the prior art compositions, it has been theorized that the colloidal silica includes residual silanol groups at the surface of the colloid particles. Further according to the theory, at least some of these residual silanol groups then undergo a condensation reaction with at least some of the silanol sites derived from the hydrolysis of the alkoxy silanes. Likewise, at least some of the hydrolyzed silanes condense with each other, thereby forming a plurality of loosely crosslinked resin nuclei, at least some of which are chemically bonded to particles of colloidal silica. According to the theory, upon curing, additional crosslinking provides a continuous resin network having colloidal silica particulate dispersed therethrough and chemically bonded therein. It is believed that the colloidal silica particles are largely responsible for imparting the compositions with abrasion-resistant properties.

In the prior art compositions, free radical polymerization of the remaining acrylate groups provides further crosslinking to the resin network, thereby "curing" the composition. The initiation of free radical polymerization can be carried out by the addition of known photoinitiators and exposure to (UV) radiation, or simple exposure to sufficiently high energy radiation such as an electron beam or even heat.

The use of aqueous colloidal silica in the formulations of such compositions has numerous drawbacks. Colloidal silica is known to have a tendency to gel, which tendency is particularly sensitive to changes in pH and solvent loss. For instance, as disclosed in Wright, unless an acid is first added to reduce the residual alkalinity imparted by the aminosilane, the addition of colloidal silica to the Michael adduct/acrylate solution results in gelling or the precipitation of silica from colloidal suspension.

Furthermore, the amount of water added to the compositions of the prior art is dictated by the amount of water in the aqueous colloidal silica. Thus, in order to get an adequate amount of colloidal silica, the compositions are generally formulated with an excess of water. An excess of water creates several problems.

The degree of hydrolysis and condensation is dictated by the amount of water. Accordingly, the degree of cross-linking in the uncured composition cannot be readily controlled.

If excess water is left in the resin composition, it can have a deleterious effect on the finish of the cured coating, unless a lengthy drying time is employed before initiating cure. Thus, the compositions are generally stripped of water. Stripping, however, also removes the polar solvent from the compositions in addition to water, greatly increasing the viscosity of the material. Thus, polar solvent must generally be reintroduced in order to achieve a coating composition having a viscosity in a usable range.

The tendency of the prior art compositions to gel is greatly increased during the stripping step. Therefore the likelihood of manufacturing scrap materials is greatly increased.

In addition to the foregoing, aqueous colloidal silica represents a substantial portion of the cost associated with the production of the prior art resins.

Thus, an organically-modified, radiation-curable silicone resin material that did not require aqueous colloidal silica as a part of its formulation would be considered highly desirable.

BRIEF DESCRIPTION OF THE INVENTION

The organically-modified, radiation-curable siloxane resin of the present invention overcomes the manufacturing difficulties and high-cost associated with the compositions of the prior art.

In accordance with the present invention, there is provided an organically-modified, radiation-curable siloxane resin comprising:

(A) at least one multifunctional acrylate; and (B) a reaction product formed from the co-hydrolysis and co-condensation of:

(a) at least one alkoxy-functional organometallic compound of the general formula M(OR)$_4$ wherein M is selected from the group consisting of Si and Ti, and each OR is the same or a different alkoxy group; and (b) at least one alkoxy silane of the general formula

wherein each OR is as defined above, each X is a monovalent organic radical that renders the alkoxy silane capable of copolymerization with the multifunctional acrylate (A) and each R' is independently a monovalent hydrocarbon radical; and a is 1, 2 or 3, b is 1, 2 or 3, c is 0, 1 or 2, and a+b+c=4; with (c) a predetermined quantity of water sufficient to cause said co-hydrolysis and permit said co-condensation without gelling said reaction product (B) or causing a precipitate to form therefrom.

The co-hydrolysis and co-condensation may optionally be carried out in the presence of a siloxane polymerization catalyst (d).

In the organically-modified, radiation-curable composition of the present invention, the degree of crosslinking in the uncured resin network is controlled by the addition of a predetermined quantity of water. Furthermore, the compositions of the present invention do not require the use of colloidal silica in order to render a cured product that exhibits highly abrasion-resistant properties.

The novel compositions of the invention are ideal for providing abrasion-resistant coatings on numerous substrates, including easily scratched organic thermoplastic and metals. The compositions of the invention have further utility as additives in paints and other coating formulations.

It is therefore an object of the present invention to provide an organically-modified, radiation-curable siloxane resin that can, when cured, exhibit highly abrasion-resistant properties without including colloidal silica in its formulation.

It is another object of the present invention to provide an organically-modified, radiation-curable siloxane resin that does not require stripping.

Yet another object of the present invention is to provide an organically-modified, radiation-curable siloxane resin composition, wherein the degree of crosslinking of the siloxane resin in its uncured state, can be controlled.

It is a feature of the present invention that certain embodiments thereof exhibit such low viscosities that no organic solvent need be added in order to render a usable coating material.

These and other objects and features of the present invention will become clear to those skilled in the art from the following Detailed Description of the Invention and Claims therefor.

DETAILED DESCRIPTION OF THE INVENTION

In the composition of the invention, component (A) comprises at least one multifunctional acrylate. As used herein, the term "multifunctional acrylate" means a monomer or oligomer which contains two or more functional groups selected from the group consisting of acryloxy and methacryloxy groups. The multifunctional acrylates may be used singly or in combination.

Those skilled in the art will recognize that the terms "oligomer" and "polymer" are frequently used interchangeably. Although "oligomer" is generally used to describe a relatively short polymer, the term has no generally accepted definition with respect to the number of repeating monomer units. As used herein then, the term "oligomer" is meant to include molecules that may also be properly referred to as polymers.

The only other restriction with respect to the multifunctional acrylates used in the compositions of invention, is that the acrylates be compatible with the remaining components of the invention, meaning that they do not have a deleterious effect that defeats the desired application for the composition. It should be noted, however, that the tendency of a given acrylate to produce a deleterious effect can, in certain circumstances, be overcome. For instance, the use of certain multifunctional acrylates may raise the viscosity of the composition of the invention to a point where it is unusable to provide a thin abrasion-resistant coating on a substrate. If, however, the composition can be rendered usable by the addition of an appropriate solvent, then the use of that multifunctional acrylate is not considered to be excluded from the present invention. Likewise, if such a high viscosity composition has utility as a castable material, it is considered to be a part of the present invention.

Several multifunctional acrylate monomers useable as component (A) are listed below:

the following diacrylates 1,6-hexanediol diacrylate, 1,4-butanediol diacrylate, ethylene glycol diacrylate, diethylene glycol diacrylate, tetraethylene glycol diacrylate,
tripropylene glycol diacrylate,
neopentyl glycol diacrylate,
1,4-butanediol dimethacrylate,
poly(butanediol) diacrylate,
tetraethylene glycol dimethacrylate,
1,3-butylene glycol diacrylate,
triethylene glycol diacrylate,
triisopropylene glycol diacrylate,
polyethylene glycol diacrylate, and
bisphenol A dimethacrylate;
the following triacrylates
trimethylolpropane triacrylate,
trimethylolpropane trimethacrylate,
pentaerythritol monohydroxy triacrylate, and
trimethylolpropane triethoxy triacrylate;
the following tetraacrylates
pentaerythritol tetraacrylate, and
di-trimethylolpropane tetraacrylate;
and a pentaacrylate known as
dipentaerythritol (monohydroxy) pentaacrylate.
These multifunctional acrylate monomers are commercially available from Aldrich Chemical Company, Inc., Milwaukee, Wis.

Examples of some specific multifunctional acrylate oligomers usable as component (A) are as follows:

Epoxy Acrylates

Bisphenol A epoxy diacrylate, available from Sartomer Company, Inc. of Exton Pa. and sold under the designation CN104. CN104 has a viscosity of 3500 cps at 65° C. and a specific gravity of 1.15.

Urethane Acrylates

Hexafunctional aromatic urethane acrylate with an acrylated polyol diluent which is sold under the designation Ebecryl 220 by UBC Radcure, Inc. of Louisville, Ky. Ebecryl 220 has a molecular weight of 1,000 and a viscosity of 28,000 cps at 25° C.

Aliphatic urethane diacrylate which is available under the designation Ebecryl 230 from UBC Radcure, Inc. of Louisville, Ky. Ebecryl 230 has a molecular weight of 5,000 and a viscosity of 40,000 cps at 25° C.

Polyester Acrylate

Tetrafunctional polyester acrylate which is sold under the designation Ebecryl 80 by UBC Radcure, Inc. of Louisville, Ky. Ebecryl 80 has a molecular weight of 1,000 and a viscosity of 3,500 cps at 25° C.

Polybutadiene Diacrylate available from Sartomer Company, Inc. of Exton Pa. CN300, under the designation CN300, has a molecular weight of 3,000, viscosity of 4,500–5,000 cps at 25° C.

As a general rule of thumb, the use of monomeric multifunctional acrylates in the composition of the invention generally results in a cured coating having hard, abrasion-resistant characteristics. On the other hand, the use of oligomeric multifunctional acrylates generally produces a slightly softer, but more flexible cured coating. The present inventors have noted that there is at least some correlation between the use of oligomeric multifunctional acrylates and decreased gas permeability of the cured coating. The use of monomeric/oligomeric multifunctional acrylate blends can balance the desired properties of the cured coating composition of the invention.

The second component (B) of the composition of the invention is the reaction product formed from: (a) at least one alkoxy-functional organometallic compound; (b) at least one alkoxy-functional silane; (c) a predetermined quantity of water; and (d) optionally, a catalytic amount of a siloxane polymerization catalyst.

The alkoxy-functional organometallic compound (a) has the general formula $M(OR)_4$, wherein M is selected from the group consisting of Si and Ti, and each OR is the same or a different alkoxy group. Preferably, the alkoxy groups have from one to four carbon atoms. Accordingly, examples of this component include tetraethoxy silane (also called tetraethyl orthosilicate) and tetrabutyl titanate. As used herein the term "organometallic compound" is specifically meant to include compounds based upon silicon, even though silicon arguably does not possess all the characteristics of a true metal.

The alkoxy-functional silane (b) is of the general formula $$X_a Si(OR)_b (R')_c$$

wherein each OR is as defined above and each X is a monovalent organic radical that renders the alkoxy silane capable of copolymerization with the multifunctional acrylate (A). In the preferred embodiment of the invention, the monovalent organic radical X of the alkoxy silane (b) includes at least one unsaturated radical selected from group consisting of vinyl, hexenyl, methacryloxy, acryloxy, styryl and vinyl ether radicals.

In the most preferred embodiment of the invention, the monovalent organic radical X is a Michael adduct. In this embodiment, the alkoxy-functional silane (b) is formed from a Michael addition reaction between an amino-functional trialkoxy silane and a multifunctional acrylate (A). The amino-functional trialkoxy silane is of the general formula $(OR)_3Si(QNH)_dQNZH$, wherein Q is a divalent hydrocarbon group, which Q groups may be the same or different, Z is hydrogen or a monovalent hydrocarbon and d is 0 or 1.

Amino and diamino radicals are capable of forming a Michael adduct with an acrylate group and are, therefore, ideally-suited and preferred selections. Examples of such amino-functional alkoxy silanes include: 3-aminopropyltriethoxysilane; 3-aminopropyltrimethoxysilane; 3-aminopropylmethyldimethoxysilane; and n-(2-aminoethyl)-3-aminopropyltrimethoxysilane. These amino-functional alkoxy silanes are commercially available from Huels America, Inc., Bristol, Pa. Another supplier of aminofunctional alkoxy silanes is Dow Corning Corporation, of Midland, Mich.

In the most preferred embodiment of the composition of the invention an aminofunctional trialkoxy silane is reacted with the multifunctional acrylate (A) to form component (b). Thus, to maintain a radiation-curable composition, an excess of multifunctional acrylate (A) must be present. That is to say, substantially all the alkoxy-functional aminosilane is reacted to form a Michael adduct but an excess of unreacted multifunctional acrylate (A) must remain.

Also in the most preferred embodiment of the invention the alkoxy-functional Michael adduct (b) is co-hydrolyzed and co-condensed with the alkoxy-functional organometallic compound (a). Accordingly, a convenient way to make the compositions of the invention is to first form a blend of a multifunctional acrylate (A), an alkoxy-functional aminosilane and an alkoxyfunctional organometallic compound (a), thus forming an alkoxy-functional Michael adduct (b) during blending. Thereafter, the predetermined amount of water (c) and, optionally, a siloxane polymerization catalyst (d) may be added to initiate the co-hydrolysis and co-condensation.

In a less preferred but viable embodiment of the invention, an alkoxy-functional aminosilane (b) is co-hydrolyzed and co-condensed with the alkoxy-functional organometallic compound (a), in its unreacted condition.

Other monovalent radicals that are reactive with the acrylate groups of multifunctional acrylate (A) so as to render component (b), the alkoxy-functional silane copolymerizable therewith, are monovalent unsaturated hydrocarbon radicals which include vinyl, hexenyl, methacryloxy, acryloxy, styryl and vinyl ether radicals. Thus, further examples of component (b) include vinyltrimethoxy silane, vinyltriethoxy silane, vinyldimethoxymethyl silane, (all available from PCR, Inc, Gainesville, Fla.), 3-(methacryloxy)propyltrimethoxy silane (sold as Dow Corning ®6030, Dow Corning Corporation, Midland, Mich.) and 3-(acryloxy)propyltrimethoxy silane.

When X is a monovalent unsaturated hydrocarbon radical, copolymerization of component (b) with component (A) takes place under conditions of free radical polymerization when the composition of the invention is cured.

Component (c) is a predetermined quantity of water. The importance and selection of the predetermined quantity is discussed hereinbelow.

Component (d) is a siloxane polymerization catalyst. Such catalysts are well-known in the art for promoting the formation of resin networks in the hydrolysis and condensation reaction of alkoxysilanes and other alkoxy-functional organometallic compounds. Examples of siloxane polymerization catalysts include strong protonic acids such as $H_2SO_4$ and $HClO_4$, trifluoromethane sulfonic acid, and a variety of Lewis Acids. Also included are supported catalysts such as $H_2SO_4$-treated montmorillonite clay. Basic siloxane polymerization catalysts include KOH, NaOH and various amines. Because it is so compatible with component (A) the multifunctional acrylate, acrylic acid is the preferred siloxane polymerization catalyst for use in the present invention.

The use of the siloxane polymerization catalyst (d) is highly preferred, but considered optional. When, for example, an alkoxy-functional amino silane is used to form component (b), the residual alkalinity of the amino groups is sufficient to promote the hydrolysis and condensation of components (a) and (b) (as explained in detail below,) albeit at a much slower rate and not to the same extent as when the catalyst (d) is employed.

It is important to note that the second component (B) of the composition of the invention is described as a reaction product.

It is well-known that alkoxy groups associated with the alkoxy-functional organometallic compounds (a) and alkoxy silanes (b) of the invention, will undergo an hydrolysis reaction in the presence of water. In the hydrolysis reaction, water reacts at the alkoxy (OR) site, leaving an hydroxyl radical (OH) and forming an HOR alcohol. Thus, one mole of water reacts with one mole of alkoxy radicals, leaving one mole of hydroxyl radicals. It is known in the art that certain of the alkoxy sites are more amenable to hydrolysis than others. Thus, the hydrolysis reaction generally reaches equilibrium well before all alkoxy sites have been hydrolyzed.

In the absence of a siloxane polymerization catalyst (d), the hydrolyzed organometallic compounds (a) and silanes (b) are fairly stable and any condensation that takes place is minimal (except as noted above, when utilizing alkoxy-functional aminosilanes to form component (b).) However, in the presence of the catalyst, both the hydrolysis and condensations reaction are driven forward. Because hydrolysis and condensation take place simultaneously, the equilibrium reached is dependent on both reactions.

In the condensation reaction, two hydroxyl radicals react to yield a single molecule of water and establish a crosslinking oxygen bond. The water liberated though condensation is then available to carry out further hydrolysis. In a manner analogous to the hydrolysis of alkoxy groups, certain of the hydroxyl sites are more amenable to condensation than others. Thus, the condensation reaction generally reaches equilibrium well before all hydrolyzed sites have been condensed.

It should be noted, however, that the hydrolysis reaction requires two molecules of water to hydrolyze two alkoxy radicals and that the condensation reaction between two hydroxyl radicals yields but a single water molecule. Theoretically then, the water will eventually be consumed, unless present in an amount which exceeds that required to hydrolyze all the hydrolyzable alkoxy sites. Thus, when not present in excess, the amount of water added to the reaction determines the degree of crosslinking which occurs between components (a) and (b).

In practice, the present inventors have discovered that adding too much water to the composition of the invention can result in two undesirable outcomes: the formation of a precipitate; or gelling of the composition. Separation of the composition into two phases has also been observed but is believed to be a manifestation of precipitation. It is theorized that as the hydrolysis and condensation reactions proceed, the crosslinking of components (a) and (b) results in the formation of a sol having a multitude of resin network nuclei dispersed throughout. It is further theorized that if too much water is present, the resin network nuclei either grow large enough to precipitate from solution, or numerous and large enough to allow condensation therebetween, resulting in gel formation.

The undesirability of making a gelled composition is self-evident, especially if the composition is to be used for forming an abrasion-resistant coating. When precipitation occurs, the composition looses its abrasion-resistant properties.

In the preferred embodiment of the invention, components (a) and (b), are blended with the multifunctional acrylate (A). Thereafter, the siloxane polymerization catalyst (d) and the predetermined amount of water (c) are added to the mixture. Thus, the reaction product (B) forms in the presence of the multifunctional acrylate (A). Indeed, if a low viscosity multifunctional acrylate (A) is used, components (a) and (b) are frequently found to be soluble therein and there is no need to use additional organic solvents, as was required in the prior art.

In accordance with the invention, the alkoxy-functional organometallic compound (a) and alkoxy silane (b) undergo co-hydrolysis and co-condensation. In practice, the present inventors have found that combining the water (c) and catalyst (d) with the alkoxy-functional organometallic compound (a) or the alkoxy silane (b), independently, yields a product that, when cured, exhibits substantially reduced abrasion-resistant properties.

It is theorized that the co-condensation of the hydrolyzed alkoxy-functional organometallic compound (a) and alkoxy silane (b) produces a resin network that has a more homogeneous chemical structure, both before and after curing.

Those skilled in the art will understand that while the composition of the present invention does not require the presence of colloidal silica, neither is it prohibited. Likewise, while many embodiments of the present invention can be successfully formulated without the use of a polar solvent, its use, for adjusting properties such as viscosity and the like, is not prohibited.

Those skilled in the art will further appreciate that the selection of specific species of (A), the multifunctional acrylate, (a) the alkoxy-functional organometallic compound and (b) the alkoxysilane, will depend primarily upon the properties desired for the end-use of the composition (e.g. abrasion resistance or gas permeability,) and cost.

Other components can be added to the compositions of the invention in order to enhance their usefulness as coatings. For example, known diluents, leveling agents, ultraviolet light absorbers, dyes and the like, can be included. Butylated hydroxytoluene (BHT) and phenothiazine (PTZ) are known in the art as inhibitors of autopolymerization of acrylates and may also be added.

If the composition of the invention is to be used as a coating material, it may be applied to substrates by known methods such as flow coating, dip coating, spin coating, spray coating or curtain coating. A coating thicknesses between 3–25 microns, and preferably about 5 microns, is generally recommended for applications calling for abrasion resistance.

Various examples of the coating composition of the invention were prepared, coated over substrates (to a thickness of about 5 microns) and UV-cured. As used herein to describe the preparation of examples of the invention, the term "UV-cured" means that the coated substrate was subjected to about 2000 millijoules of UV radiation/cm$^2$ or greater.

The abrasion resistance of the cured compositions of the invention was determined according to ASTM Method D-1044. The instrument used was a Teledyne model 503 Taber Abrader with two 250 gram auxiliary weights (500 gram load) for each of the CS10F abrasive wheels. In accordance with the ASTM method, coated polycarbonate Taber panels were subjected to 100 and 500 cycles on the abrader turntable (T-100 and T-500, respectively). The percent change in haze, which is the criterion for determining the abrasion resistance of the coating, was determined by measuring the difference in haze of the unabraded and abraded coatings. Haze is defined as the percentage of transmitted light which, in passing through the sample, deviates from the incident beam by forward scattering. In this method, only light flux that deviates more than 2.5 degrees on average is considered to be haze. The percent haze on the coatings was determined by ASTM Method D-1003. A Gardner Haze Meter was used and the haze was calculated by measuring the amount of diffused light, dividing by the amount of transmitted light and multiplying by one hundred.

The above-described Taber abrasion testing is not limited to the use of polycarbonate test panels. In the event that a given composition does not adhere to a polycarbonate substrate, any other substantially transparent, preferably plastic, substrate may be used, so long as the composition adheres thereon.

The measure of turbidity of the composition of the invention is made relative to a standard and expressed simply as an index. As reported herein, turbidity was measured on a Series 965 Digital Direct-Reading Turbidimeter (available from Orbeco Analytical Systems, Inc. of Farmingdale, N.Y. 11735) and in accordance with the instructions provided therewith.

CONCRETE EXAMPLES OF THE INVENTION

Example 1

Tetraacrylate Monomer/Aminoalkoxy Silane/ Tetraethoxy Silane Composition 11.8 g of a solventless pentaerythritol tetraacrylate (available from Sartomer, Inc. of Exton, Pa. under the name Sartomer 295, or SR 295,) 2.18 g of tetraethoxy silane and 1.24 g of aminopropyltriethoxy silane were stirred in 500 ml flask over night. (Typically, adequate mixing and the Michael adduct reaction between the alkoxy-functional aminosilane and acrylate can be achieved with one hour of stirring.) Thereafter, 0.85 g of a siloxane polymerization catalyst in the form of acrylic acid was added drop-wise and the resulting solution stirred for an additional hour. 0.35 grams of water were then added dropwise with continued stirring for an additional hour. The resulting solution had a turbidity index of 6.2 and a viscosity of 364 cps.

0.68 g of a photoinitiator (Darocure 1173, from Ciba Geigy, hydroxymethylphenylpropanone,) was then added to the composition which was then applied to a polycarbonate test panel, and cured with ultraviolet radiation. The resulting composition exhibited Taber abrasion resistance of T-100= 2.3 and T-500=6.7.

Example 2

Triacrylate Monomer/Aminoalkoxy Silane/ Tetraethoxy Silane Composition

A composition identical to that described above (1) was prepared except that an identical weight of pentaerythritol triacrylate (Sartomer 444) was substituted for the pentaerythritol tetraacrylate (Sartomer 295.) The resulting solution had a turbidity index of 1.5 and viscosity of 322 cps. The cured composition exhibited Taber abrasion resistance of T-100=2.1 and T-500=6.5.

Example 3

Tetraacrylate Monomer/ Methacryloxypropyltrimethoxy Silane/Tetraethoxy Silane Composition 11.8 g of a solventless pentaerythritol tetraacrylate (available from Sartomer, Inc. of Exton, Pa. under the name Sartomer 295, or SR 295,) 2.18 g of tetraethoxy silane and 1.24 g of methacryloxypropyltrimethoxy silane were stirred in 500 ml flask over night. (Typically, adequate mixing can be achieved with one hour of stirring.) Thereafter, 0.85 g of a siloxane polymerization catalyst in the form of acrylic acid was added drop-wise and the resulting solution stirred for an additional hour. 0.35 grams of water were then added dropwise with continued stirring for an additional hour. The resulting solution had a turbidity index of 2.7 and a viscosity of 38.1 cps.

0.68 g of a photoinitiator (Darocure 1173, from Ciba Geigy) was then added to the composition which was then applied to a polycarbonate test panel, and cured with ultraviolet radiation. The cured composition exhibited Taber abrasion resistance of T-100=1.6 and T-500=7.1.

Example 4

Triacrylate Monomer/ Methacryloxypropyltrimethoxy Silane/Tetraethoxy Silane Composition A composition identical to that described above (3) was prepared except that an identical weight of pentaerythritol triacrylate (Sartomer 444) was substituted for the pentaerythritol tetraacrylate (Sartomer 295.) The resulting solution had a turbidity index of 7.3 and viscosity of 36.1 cps. The cured composition exhibited Taber abrasion resistance of T-100=2.4 and T-500=9.0.

Example 5

Triacrylate Monomer/ Methacryloxypropyltrimethoxy Silane/Tetrabutyl Titanate Composition 11.8 g of pentaerythritol triacrylate (SR 444,) 1.64 g of tetrabutyl titanate were stirred in 500 ml flask for one hour.

1.24 g of methacryloxypropyltrimethoxy silane was added, with continued stirring for an additional hour. Thereafter, 0.63 g of acrylic acid was added with continued stirring for an additional hour. Next 0.7 g of water was added in a drop-wise manner and mixed for one hour. The resulting solution had a turbidity index of 2.1 and a viscosity of 54.1 cps. 0.64 g of Darocure 1173, Ciba Geigy's photoinitiator, was stirred in and the composition applied to and UV-cured on polycarbonate panels for Taber testing. Abrasion testing yielded T-100 of 2.2 and T-500 of 9.4, indicating excellent abrasion-resistant properties.

Example 6

Triacrylate Monomer/
Methacryloxypropyltrimethoxy Silane/Tetrabutyl
Titanate/Tetraethoxy Silane Composition In order to test the compatibility of two different types of alkoxy-functional organometallic compounds (component (a),) a composition identical to that disclosed in Example 5, above, was prepared, except that tetraethoxy silane was substituted for one-half (0.82 g) of the tetrabutyl titinate, for the total of 1.64 g of mixed alkoxy-functional organometallic compounds. The resulting composition had a viscosity of 74.1 cps and a turbidity index of 1.6. The UV-cured composition exhibited Taber abrasion of T-100=3.4.

Example 7

Tetraacrylate Monomer/
Methacryloxypropyltrimethoxy Silane/
Aminopropyltriethoxy Silane/Tetraethoxy Silane
Composition In order to test the compatibility of two different types of alkoxy-functional silanes used to make component (b), a composition identical to that disclosed in Example 3 was prepared, except that aminopropyltriethoxy silane was substituted for one-half (0.62 g) of the methacryloxypropyltrimethoxy silane, for a total of 1.24 g of mixed alkoxy-functional aminosilanes. The resulting composition had a viscosity of 163 cps and a turbidity index of 1.0. The UV-cured composition exhibited Taber abrasion of T-100= 2.2 and T-500=8.2, indicating excellent abrasion resistance.

Example 8

Hexafunctional Aromatic Urethane Acrylate
Oligomer/Aminopropyltriethoxy Silane/Tetraethoxy
Silane Composition 11.8 g of an hexafunctional aromatic urethane acrylate (with an acrylated polyol diluent) sold under the designation Ebecryl 220 and described hereinabove, 2.18 g tetraethoxy silane and 1.24 g of aminopropyltriethoxy silane were added to a flask and stirred for one hour. Thereafter 2.7 g of acrylic acid were added and the solution stirred for an additional hour. 2.7 g of water were added in a drop-wise manner and the solution stirred for an additional hour. The resulting solution had a viscosity of 600 cps and a turbidity index of 10.7. 0.64 g of Darocure 1173, Ciba Geigy's photoinitiator, was stirred in and the composition applied to and UV-cured on polycarbonate panels for Taber testing. Abrasion testing yielded T-100 of 3.0 and T-500 of 7.6, indicating excellent abrasion-resistant properties.

Testing for the Range of the Most Useful
Formulations

As previously mentioned, the compositions of the invention have diverse utility. Accordingly, the range of the most useful formulations depends upon the specific coating property that is of importance. For instance, the range of formulations that provides a coating having barrier properties may be considerably different than the range that provides substantial abrasion-resistance.

The technique described below was used to establish the range of the most useful formulations for providing abrasion-resistant properties, when the composition of the invention includes a specific tetraacrylate monomer and aminosilane.

Referring once again to the embodiment disclosed above, Example 1, under Concrete Examples of the Invention, it can be seen that the formulation provided excellent abrasion resistance as measured by the Taber Abrasion test. Numerous samples of this composition were prepared in a manner identical to that described above, except that the quantities of tetraethoxy silane, aminopropyltriethoxysilane, acrylic acid and water were independently varied (all other constituents and quantities remaining constant.) The Taber abrasion resistance of each of the varied formulations was measured and any difficulties associated with preparation were noted. The results are reported below in Tables 1 through 4. The * denotes the composition of Example 1.

TABLE 1

Variations in Tetraethoxy silane (TEOS)

| TEOS (g) | T-100 | T-500 | Viscosity (cps) |
| --- | --- | --- | --- |
| 0.0 | 4.1 | 14.4 | 822 |
| 0.27 | 3.2 | 6.3 | 1130 |
| 1.09 | 3.4 | 6.8 | 750 |
| 2.18* | 3.2 | 7.8 | 428 |
| 4.36 | 7.2 | 19.8 | 124 |
| 8.72 | 4.5 | 15.8 | 38.1 |

TABLE 2

Variations in Aminopropyltriethoxysilane (AMPTES)

| AMPTES (g) | T-100 | T-500 | Viscosity (cps) |
| --- | --- | --- | --- |
| 0.0 | 4.7 | 15.2 | 14.0 |
| 0.32 | 3.6 | 15.4 | 22.0 |
| 0.62 | 4.4 | 11.1 | 30.1 |
| 1.24* | 3.4 | 6.8 | 750 |
| 2.48 | 5.3 | 20.9 | 1130 |
| 4.96 | — | — | GEL |

TABLE 3

Variations in Acrylic Acid (AA)

| AA (g) | T-100 | T-500 | Viscosity (cps) |
| --- | --- | --- | --- |
| 0.0 | 4.2 | 15.2 | 90.2 |
| 0.42 | 3.6 | 9.7 | 750 |
| 0.85* | 3.4 | 6.8 | 710 |
| 1.7 | 5.4 | 11.1 | 742 |
| 3.4 | 3.2 | 10.7 | 471 |

TABLE 4

Variations in Water

| Water (g) | T-100 | T-500 | Viscosity (cps) |
| --- | --- | --- | --- |
| 0.0 | 2.7 | 12.9 | 782 |
| 0.17 | 3.5 | 8.2 | 731 |

TABLE 4-continued

Variations in Water

| Water (g) | T-100 | T-500 | Viscosity (cps) |
|---|---|---|---|
| 0.35* | 3.4 | 6.8 | 750 |
| 0.70 | 2.9 | 7.5 | 481 |
| 1.4 | 3.8 | 6.8 | 230 |
| 2.8 | 3.8 | 7.0 | 291 |
| 5.6 | 45.4 | — | two phases |

The foregoing Tables (1 through 4) illustrate how to determine the usable range of components for embodiments of the invention that utilize a pentaerythritol tetraacrylate (multifunctional acrylate (A),) tetraethoxy silane (alkoxy-functional organometallic compound (a),) aminopropyltri-ethoxy silane (used to form the alkoxy-functional silane (b),) (c) water and acrylic acid (siloxane polymerization catalyst (d).) In this instance, the range of useful compositions was directed at those compositions that would yield the most abrasion-resistant properties, based upon a constant amount of pentaerythritol tetraacrylate (11.8 parts, by weight.)

Referring now to the Tables, it can be seen that the most abrasion-resistant properties were exhibited when the level of: tetraethoxy silane was at least 0.27 parts and something less than 4.36 parts (Table 1); aminopropyltriethoxy silane was greater than 0.32 parts and less than 2.48 parts; at least some acrylic acid was present in an amount up to 3.4 parts; and the predetermined quantity of water was maintained between about 0.17 and about 2.8 parts, inclusive.

Optimizing the abrasion-resistant properties of the formulation can be carried out with further experimentation on a trial and error basis. With the above information, the present inventors prepared a composition having 11.8 parts of pentaerythritol tetraacrylate (multifunctional acrylate (A),) 1.64 parts tetraethoxy silane (alkoxy-functional organometallic compound (a),) 1.24 parts aminopropyltriethoxy silane (alkoxy-functional silane (b),) 0.70 parts water (c) and 0.63 parts acrylic acid (siloxane polymerization catalyst (d).) The cured composition so-prepared exhibited Taber abrasion properties of T-100 at 3.1 and T-500 at 7.1.

In the foregoing Detailed Description of the Invention certain features and advantages of the invention have been illustrated by way of example. Numerous other embodiments of the invention will become apparent to those skilled in the art. Furthermore, certain theories relating to the invention have been offered in an attempt to explain the novel behavior and physical characteristics of the invention. The use of the aforementioned examples and disclosure of theories are not intended to limit the scope of the present invention in any way, which scope is clearly defined in the following claims and equivalents thereof.

What is claimed is:

1. A radiation-curable siloxane resin composition comprising:
   (A) at least one multifunctional acrylate; and
   (B) a reaction product formed from the co-hydrolysis and co-condensation of:
      (a) at least one alkoxy-functional organometallic compound of the general formula M(OR)$_4$ wherein M is selected from the group consisting of Si and Ti, and each OR is the same or a different alkoxy group; and
      (b) at least one alkoxy silane of the general formula

$X_a Si(OR)_b (R')_c$ wherein
      each OR is as defined above,
      each X is a monovalent organic radical that renders the alkoxy silane capable of copolymerization with the multifunctional acrylate (A) and is selected from the group consisting of organic radicals including at least one ethylenically unsaturated group
      each R' is independently a monovalent hydrocarbon radical; and
      a is 1, 2 or 3,
      b is 1, 2 or 3,
      c is 0, 1 or 2, and
      a+b+c=4; with
   (c) a predetermined quantity of water sufficient to cause said co-hydrolysis and permit said co-condensation without gelling said reaction product (B) or causing a precipitate to form therefrom,
   said co-hydrolysis and co-condensation being carried out by first blending (a) said at least one alkoxy-functional organometallic compound and (b) said at least one alkoxysilane and thereafter adding (c) said predetermined quantity of water to the blend so-formed.

2. A composition in accordance with claim 1 wherein said reaction product (B) is formed with the aid of (d) a siloxane polymerization catalyst.

3. A composition in accordance with claim 2 wherein said siloxane polymerization catalyst is selected from the group consisting of $H_2SO_4$, $HClO_4$, trifluoromethane sulfonic acid, acrylic acid, KOH, NaOH and amine-containing compounds.

4. A composition in accordance with claim 1 wherein said monovalent organic radical X of said at least one alkoxy silane includes unsaturated radicals selected from group consisting of vinyl, hexenyl, methacryloxy, acryloxy, styryl and vinyl ether radicals.

5. A composition in accordance with claim 1 wherein M is Si.

6. A composition in accordance with claim 5 wherein said alkoxy-functional organometallic compound (a) is tetraethoxy silane.

7. A composition in accordance with claim 1 wherein M is Ti.

8. A composition in accordance with claim 7 wherein said alkoxy-functional organometallic compound (a) is tetrabutyl titanate.

9. A composition in accordance with claim 1 further comprising a photoinitiator.

10. A composition in accordance with claim 1 wherein said at least one multifunctional acrylate (A) is a monomer.

11. A composition in accordance with claim 1 wherein said at least one multifunctional acrylate (A) is an oligomer.

12. An article of manufacture comprising the radiation-cured composition of claim 1.

13. An article of manufacture comprising:
   a substrate presenting at least one surface;
   said at least one surface having a cured coating formed thereon;
   said cured coating being formed from the composition of claim 1.

14. An article of manufacture in accordance with claim 13 wherein said substrate is polyethylene terphthalate.

15. An article in accordance with claim 14 wherein said polyethylene terphthalate substrate is in the form of a container, adapted for receiving beverages.

16. An article in accordance with claim 13 wherein said substrate is polycarbonate.

17. A composition in accordance with claim 1 wherein (b) said at least one alkoxy silane is the product of a Michael Addition reaction of an amino-functional alkoxysilane and a multifunctional acrylate.

18. A method of making an organically-modified, radiation-curable siloxane resin comprising the steps of:

(I) forming a blend of:
  at least one multifunctional acrylate;
  at least one trialkoxy aminosilane of the general formula $$(OR)_3Si(QNH)_dQNZH$$

wherein each OR is an alkoxy group, each Q is a divalent hydrocarbon, which Q groups may be the same or different, and Z is hydrogen or a monovalent hydrocarbon and d is 0 or 1; and
  at least one alkoxy-functional organometallic compound of the general formula $M(OR)_4$ wherein M is selected from the group consisting of Si and Ti, and each OR is the same or a different alkoxy group;
  substantially all of said trialkoxy aminosilane reacting with said multifunctional acrylate so as to form an acrylate- and alkoxy-functional Michael adduct therefrom;
  said multifunctional acrylate being present in an amount that is in excess of that required to form an acrylate- and alkoxy-functional Michael adduct from reaction with substantially all of said trialkoxy aminosilane; and (II) adding a predetermined quantity of water to the blend formed in step (I), said predetermined quantity of water being sufficient to cause co-hydrolysis and permit co-condensation of said alkoxy-functional organometallic compound (a) and said acrylate- and alkoxy-functional Michael adduct without gelling or causing a precipitate to form therefrom.

19. A method in accordance with claim 18 wherein a siloxane polymerization catalyst is added to the blend formed in step (I), prior to the addition of water in step (II).

20. A method in accordance with claim 18 further comprising the step of (III) adding at least one photoinitiator to the product obtained after steps (I) and (II).

21. A method in accordance with claim 18 wherein said blend is formed from: about 11.8 parts, by weight, of said multifunctional acrylate (A); about 0.27 to about 4.36 parts, by weight of said alkoxy-functional organometallic compound; about 0.32 to about 2.48 parts, by weight of said trialkoxy aminosilane aminosilane; and about 0.17 to about 2.8 parts, by weight, of water.

22. A radiation-curable siloxane resin made in accordance with the method of claim 18.

* * * * *